(12) United States Patent
Chen

(10) Patent No.: US 12,362,504 B2
(45) Date of Patent: Jul. 15, 2025

(54) CABLE GROUNDING ASSEMBLIES FOR TELECOMMUNICATIONS ENCLOSURES

(71) Applicant: COMMSCOPE TECHNOLOGIES LLC, Hickory, NC (US)

(72) Inventor: Chien-An Chen, Fuquay-Varina, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 666 days.

(21) Appl. No.: 17/431,977

(22) PCT Filed: Feb. 18, 2020

(86) PCT No.: PCT/US2020/018618
§ 371 (c)(1),
(2) Date: Aug. 18, 2021

(87) PCT Pub. No.: WO2020/172153
PCT Pub. Date: Aug. 27, 2020

(65) Prior Publication Data
US 2022/0120985 A1    Apr. 21, 2022

Related U.S. Application Data

(60) Provisional application No. 62/806,966, filed on Feb. 18, 2019.

(51) Int. Cl.
*G02B 6/44* (2006.01)
*H01R 4/64* (2006.01)
(Continued)

(52) U.S. Cl.
CPC ......... *G02B 6/4441* (2013.01); *G02B 6/4471* (2013.01); *H01R 4/646* (2013.01); *H01R 4/30* (2013.01); *H01R 11/05* (2013.01)

(58) Field of Classification Search
CPC .. G02B 6/3817; G02B 6/3897; G02B 6/4471; H01R 4/64
See application file for complete search history.

(56) References Cited

U.S. PATENT DOCUMENTS 4,805,979 A * 2/1989 Bossard ............. G02B 6/44785
385/135
5,070,429 A * 12/1991 Skirpan .................... H02B 1/52
361/828

(Continued)

FOREIGN PATENT DOCUMENTS

| DE | 37 26 718 A1 | 2/1989 |
| WO | 2005/020400 A1 | 3/2005 |
| WO | 2020/154418 A1 | 7/2020 |

OTHER PUBLICATIONS

International Search Report and Written Opinion of the International Searching Authority for International Patent Application No. PCT/US2020/018618 mailed Jun. 22, 2020, 12 pages.

*Primary Examiner* — Eric Wong
(74) *Attorney, Agent, or Firm* — Merchant & Gould P.C.

(57) ABSTRACT

Devices, assemblies and methods for fixing and grounding telecommunications cables entering telecommunications closures. A plurality of cable fixation units are independently conductively coupled to components of a grounding assembly with conductive couplers. The conductive couplers are attached to a grounding bar that is fixed relative to the cable fixation units.

22 Claims, 13 Drawing Sheets

(51) Int. Cl.
   *H01R 4/30* (2006.01)
   *H01R 11/05* (2006.01)

(56) References Cited

U.S. PATENT DOCUMENTS

| | | | |
|---|---|---|---|
| 5,241,135 A | | 8/1993 | Fetzer |
| 5,652,820 A | * | 7/1997 | Glaser .................. G02B 6/4417 |
| | | | 385/134 |
| 5,824,961 A | | 10/1998 | Burek et al. |
| 6,261,111 B1 | * | 7/2001 | Castleman ........... H01R 13/518 |
| | | | 439/160 |
| 6,313,981 B1 | * | 11/2001 | Bernier .................... H02B 1/21 |
| | | | 24/336 |
| 6,340,250 B1 | | 1/2002 | Auclair |
| 7,254,307 B2 | | 8/2007 | Xin |
| 7,883,382 B2 | | 2/2011 | Howard et al. |
| 10,976,513 B2 | | 4/2021 | Allen et al. |
| 11,495,899 B2 | * | 11/2022 | Zbinden ............... H01R 12/714 |
| 2010/0059246 A1 | * | 3/2010 | Wakileh ............... G02B 6/4477 |
| | | | 174/78 |
| 2010/0285678 A1 | * | 11/2010 | Mech .................... H01R 13/502 |
| | | | 439/101 |
| 2012/0230646 A1 | | 9/2012 | Thompson et al. |
| 2012/0318933 A1 | * | 12/2012 | Kimbrell .............. G02B 6/4471 |
| | | | 248/56 |
| 2015/0270637 A1 | * | 9/2015 | Islam ....................... G02B 6/44 |
| | | | 439/533 |
| 2017/0343759 A1 | | 11/2017 | Kishimoto et al. |
| 2018/0157002 A1 | * | 6/2018 | Bishop ................. H02G 15/013 |
| 2018/0159319 A1 | * | 6/2018 | Miller ...................... H01Q 1/50 |
| 2018/0261986 A1 | | 9/2018 | Kempeneers et al. |
| 2020/0073071 A1 | * | 3/2020 | Allen ..................... G02B 6/443 |

\* cited by examiner

CABLE GROUNDING ASSEMBLIES FOR TELECOMMUNICATIONS ENCLOSURES

CROSS-REFERENCE TO RELATED APPLICATION

This application is a National Stage Application of PCT/US2020/018618, filed on Feb. 18, 2020, which claims the benefit of U.S. Patent Application Ser. No. 62/806,966, filed on Feb. 18, 2019, the disclosures of which are incorporated herein by reference in their entireties. To the extent appropriate, a claim is made to each of the above disclosed application.

TECHNICAL FIELD

The present disclosure relates to telecommunications enclosures, and more particularly to devices for grounding telecommunications cables that are fixed to telecommunications enclosures.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures.

In certain applications, the enclosure/housing needs to be water and contaminant (e.g., dust) proof or water-resistant. In particular, water, moisture, cleaning fluids, dust etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween.

To accommodate cables entering the enclosure through ports in the enclosure wall, corresponding sealing blocks positioned at the port locations of the enclosure can include sealing blocks that define cable passages such that the sealing blocks can be compressed around the cable forming a seal.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing the optical fibers held by the cable to be managed within the closure.

Typically, fixing and un-fixing cables to/from the interior of a closure is a cumbersome and time-consuming process.

In addition, in certain applications and jurisdictions, there is a need to electrically ground certain telecommunications enclosures. The electrical grounding may be used to dissipate static electricity, provide a return path for electrical power, provide a safety ground in case of equipment malfunction, etc. Certain enclosure housings are made of non-conductive material (e.g., plastic, fiber glass, etc.). As the enclosure/housing may not readily conduct electricity, a grounding cable may be passed through a port of the housing/enclosure and conductively couple to electrically conductive portions of a telecommunications cable that is fixed inside the closure. Specific grounding requirements for enclosures such as telecommunications enclosures can vary among jurisdictions depending on applicable laws and regulations. Portions of optical cables fixed to a closure that can be grounded include, e.g., one or more electrically conductive strength rods or strength members of the cables and a conductive shield that extends along the axis of the cable and radially surrounds the cable's optical fibers.

In addition to being used for grounding, electrically conductive axially extending elements of telecommunications cables (such as metal strength members and conductive shields) can be used for toning or tracing, whereby an electrical signal is introduced to an axially extending conductive element of a cable and received or detected where the cable is fixed inside a closure. In this way, a technician can, e.g., identify a specific cable from a plurality of cables.

SUMMARY

In general terms, the present disclosure is directed to improvements in grounding of cables inside telecommunications closures. The grounding assemblies and connections described herein can provide increased efficiency and simplicity when installing and de-installing the grounding assemblies.

Additional advantages related to cable toning also can be provided by the grounding assemblies of the present disclosure. Typically, toning can be complicated by telecommunications grounding systems, in that the grounding system electrically couples the cables fixed to the closure to one another, making it difficult to electrically isolate one cable from another when performing a toning procedure. The grounding assemblies described herein can simplify a toning process by making it easier to electrically isolate each cable fixed to a closure from other cables fixed to the closure.

According to certain aspects of the present disclosure, a grounding assembly for a fiber optic closure, comprises: a grounding bar adapted to be electrically grounded via a grounding cable, the grounding bar being in a fixed position relative to a plurality of cable attachment locations, the cable attachment locations being defined by mutually parallel reference lines that are also configured to be parallel to axes of cables when the cables are attached to cable fixation units positioned at the cable attachment locations, the grounding bar crossing the plurality of reference lines; and at least one electrically conductive coupler adapted to selectively conductively couple and selectively electrically isolate a telecommunications cable attached at one of the cable attachment locations and the grounding bar, the grounding bar being in the fixed position both when the electrically conductive coupler is conductively coupled to, and electrically isolated from, the grounding bar.

According to further aspects of the present disclosure, an electrically conductive coupler for electrically coupling a cable fixation unit to a grounding bar is provided, the electrically conductive coupler including a body and first and second spaced apart arms extending from the body, the body and first and second arms defining a substantially squared C-shape profile, the body and first and second arms defining an open space between the first and second arms and adjacent the body through which optical fibers can pass.

According to further aspects of the present disclosure, a method of grounding a plurality of cables fixed to a portion of a telecommunications closure at cable fixation units comprises: securing electrically conductive couplers to cable fixation units; and securing each of the electrically conductive couplers to a grounding bar, the grounding bar being in a fixed position relative to the cable fixation units and attached to a portion of the telecommunications closure such that the grounding bar is positioned within an interior volume defined by the closure when the closure is in a closed configuration.

The following patent documents are hereby incorporated by reference in their entireties: U.S. Patent Application Publication No. 2018/0261986, U.S. Provisional Patent Application No. 62/725,106 filed Aug. 30, 2018, U.S. Non-Provisional patent application Ser. No. 16/555,739 file Aug. 29, 2019, U.S. Provisional Patent Application No. 62/795,316 filed Feb. 4, 2019, and International PCT Application No. PCT/US2020/014634 filed Jan. 22, 2020.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
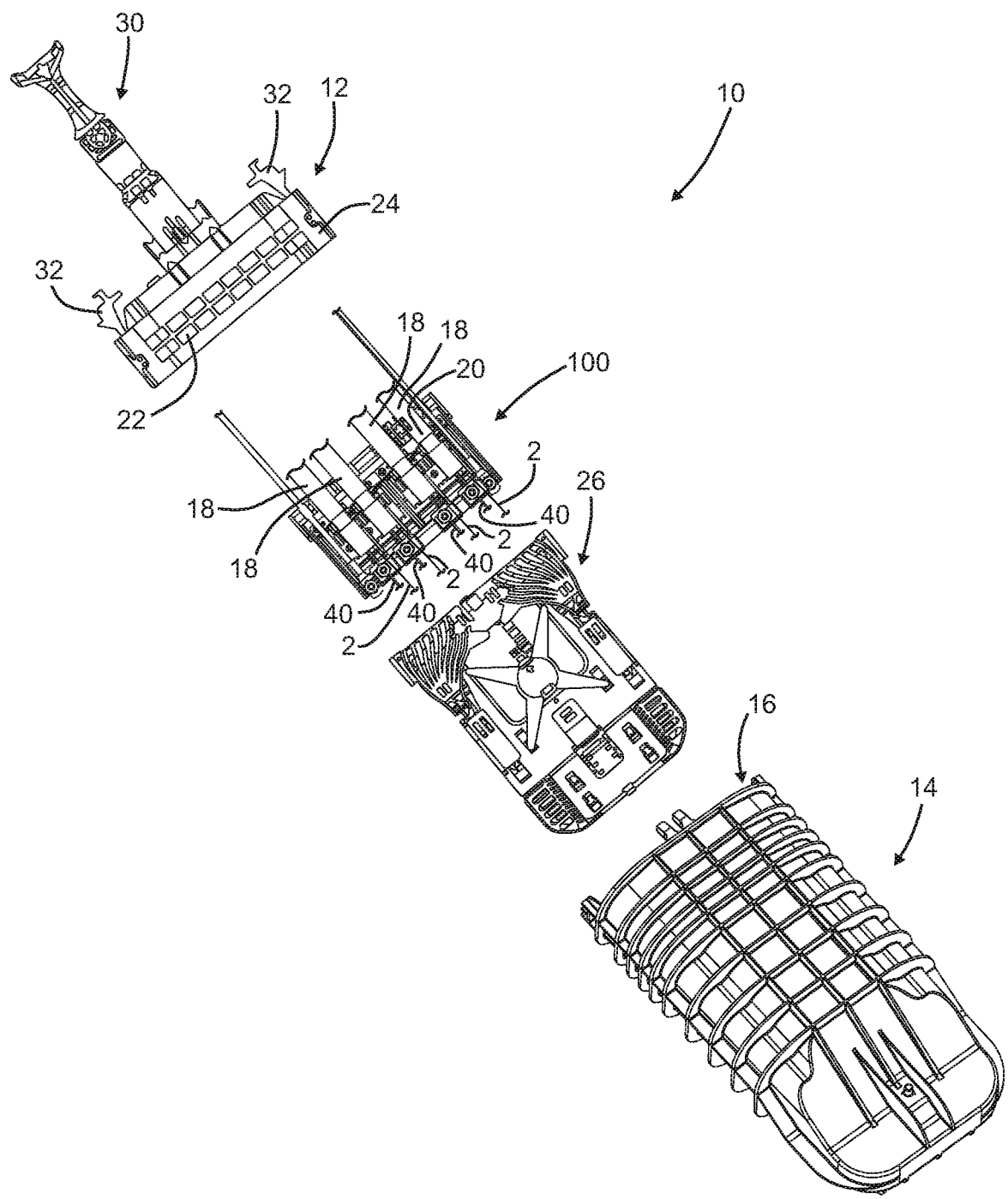
FIG. 1 is a perspective view of components of an example telecommunications closure including an example cable grounding and fixation assembly.
Figure 2:
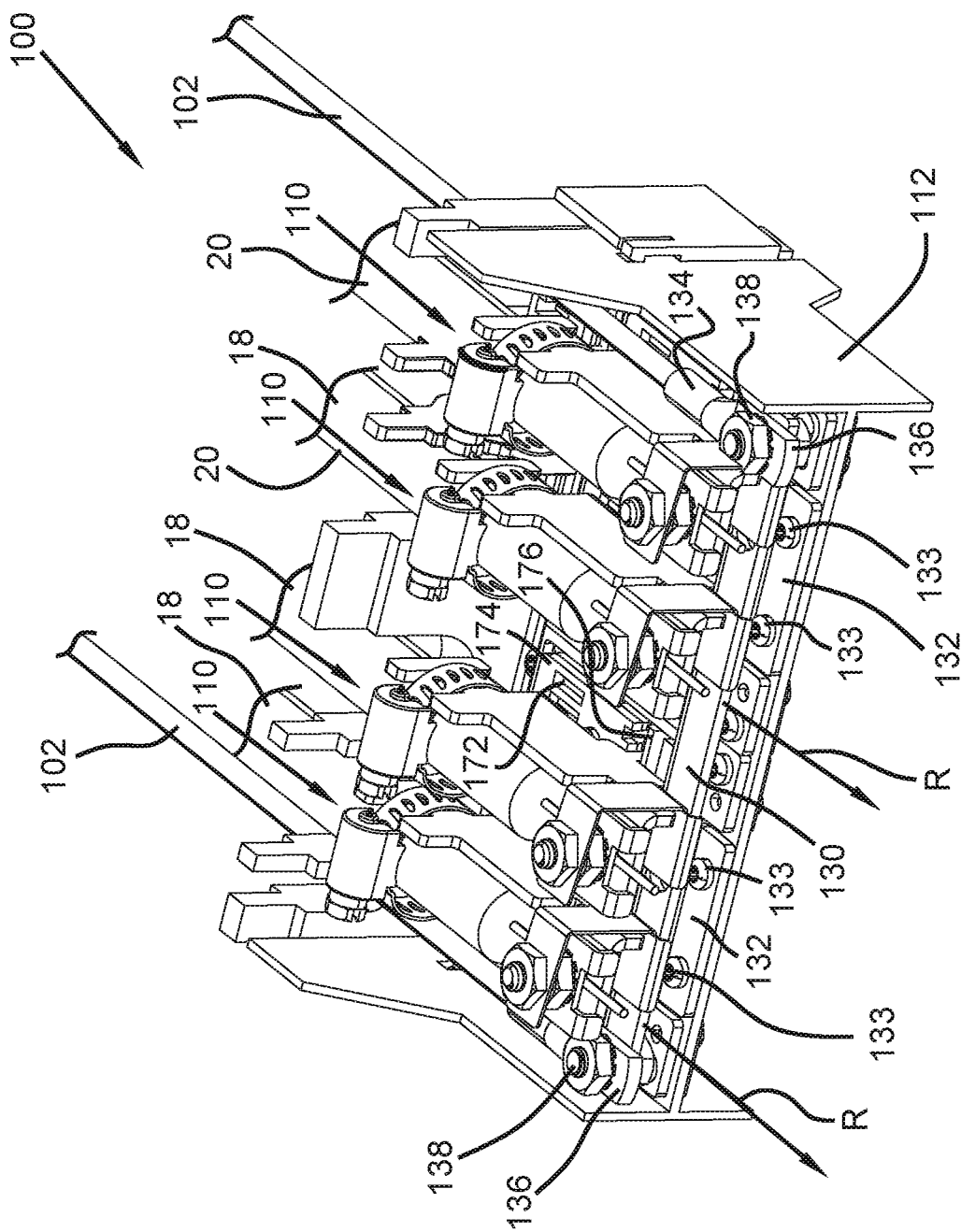
FIG. 2 is a perspective view of the cable grounding and fixation assembly of FIG. 1.
Figure 3:
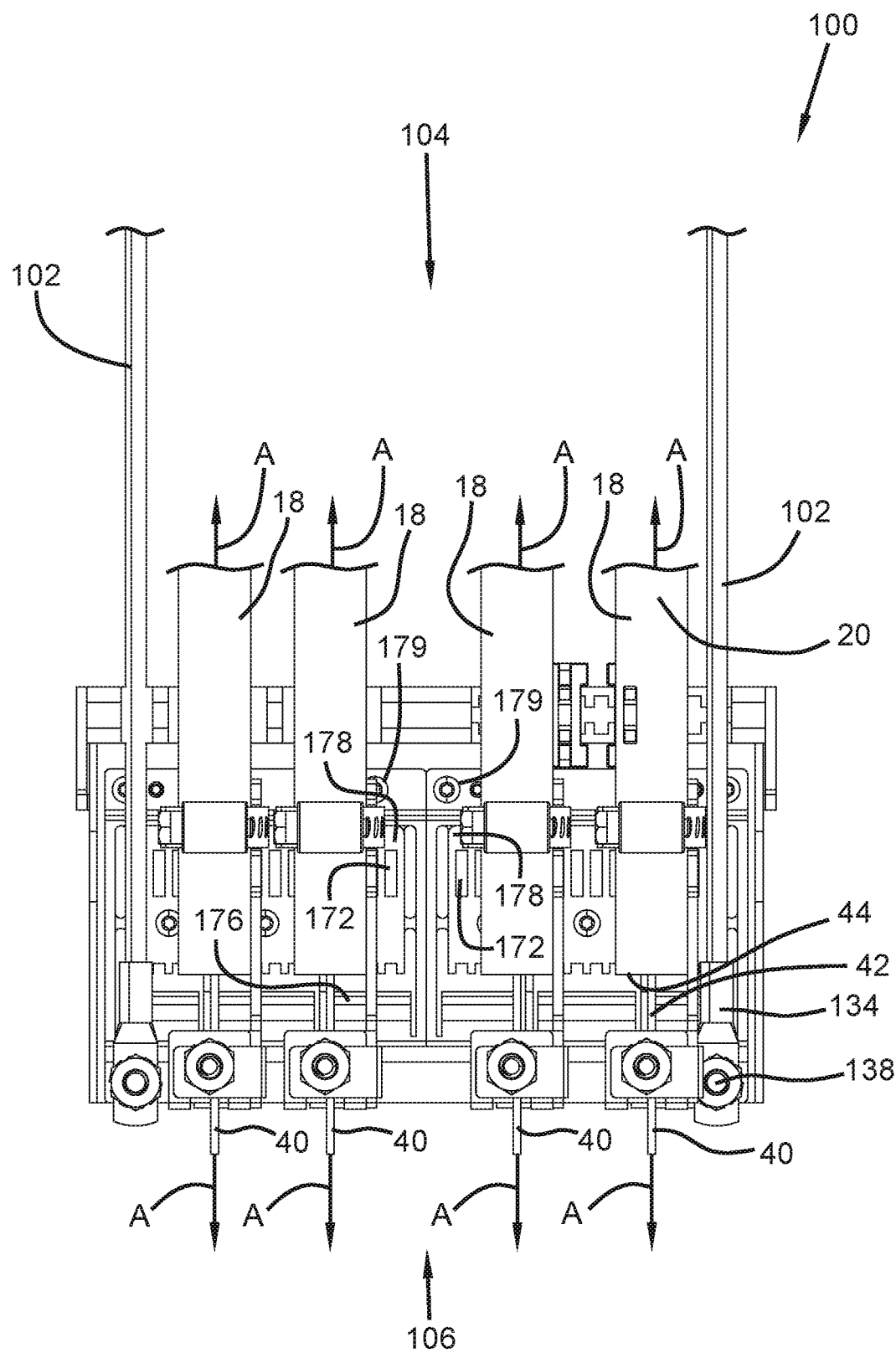
FIG. 3 is a side view of the cable grounding and fixation assembly of FIG. 1.
Figure 4:
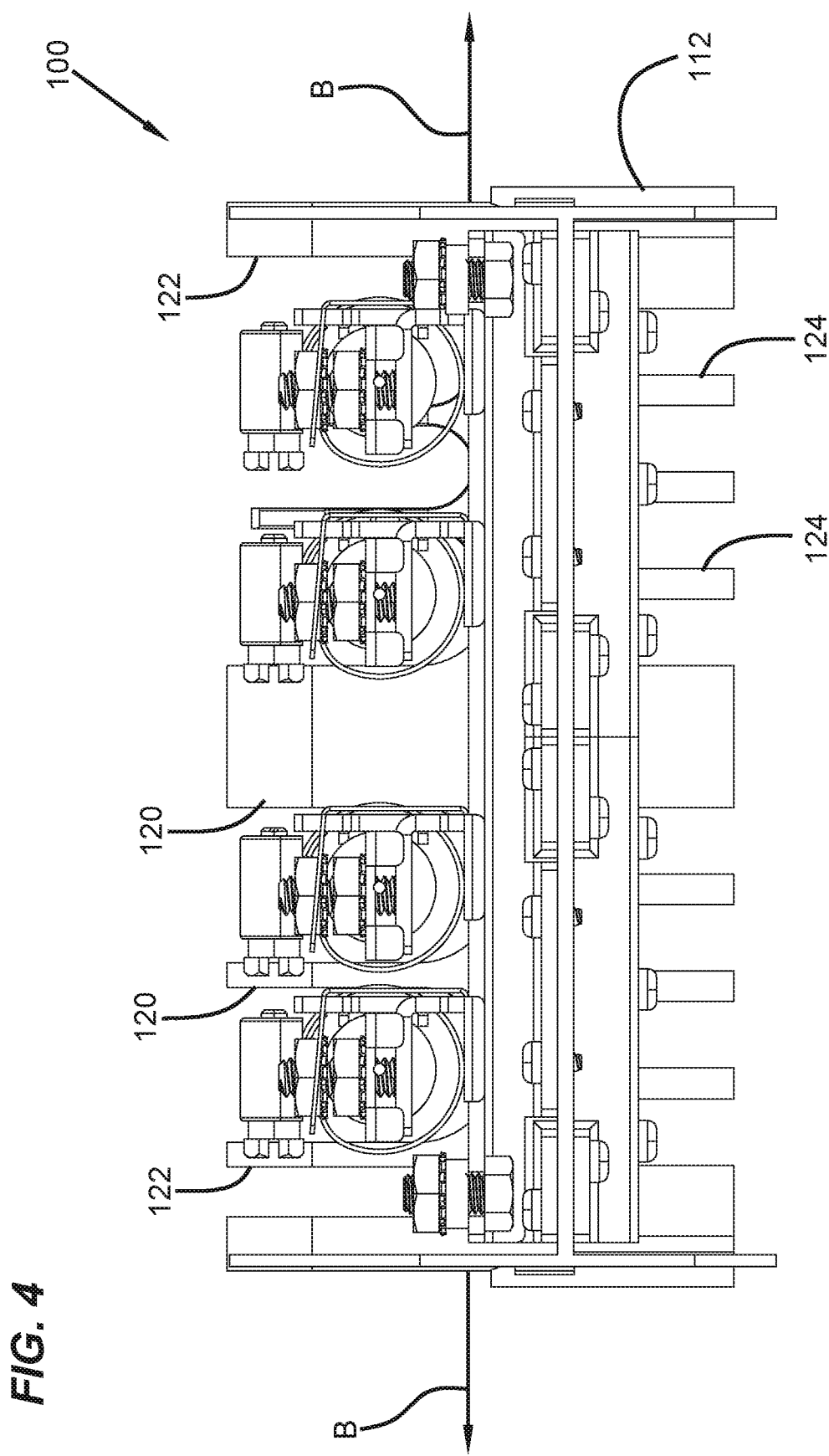
FIG. 4 is an end view of the cable grounding and fixation assembly of FIG. 1.
Figure 5:
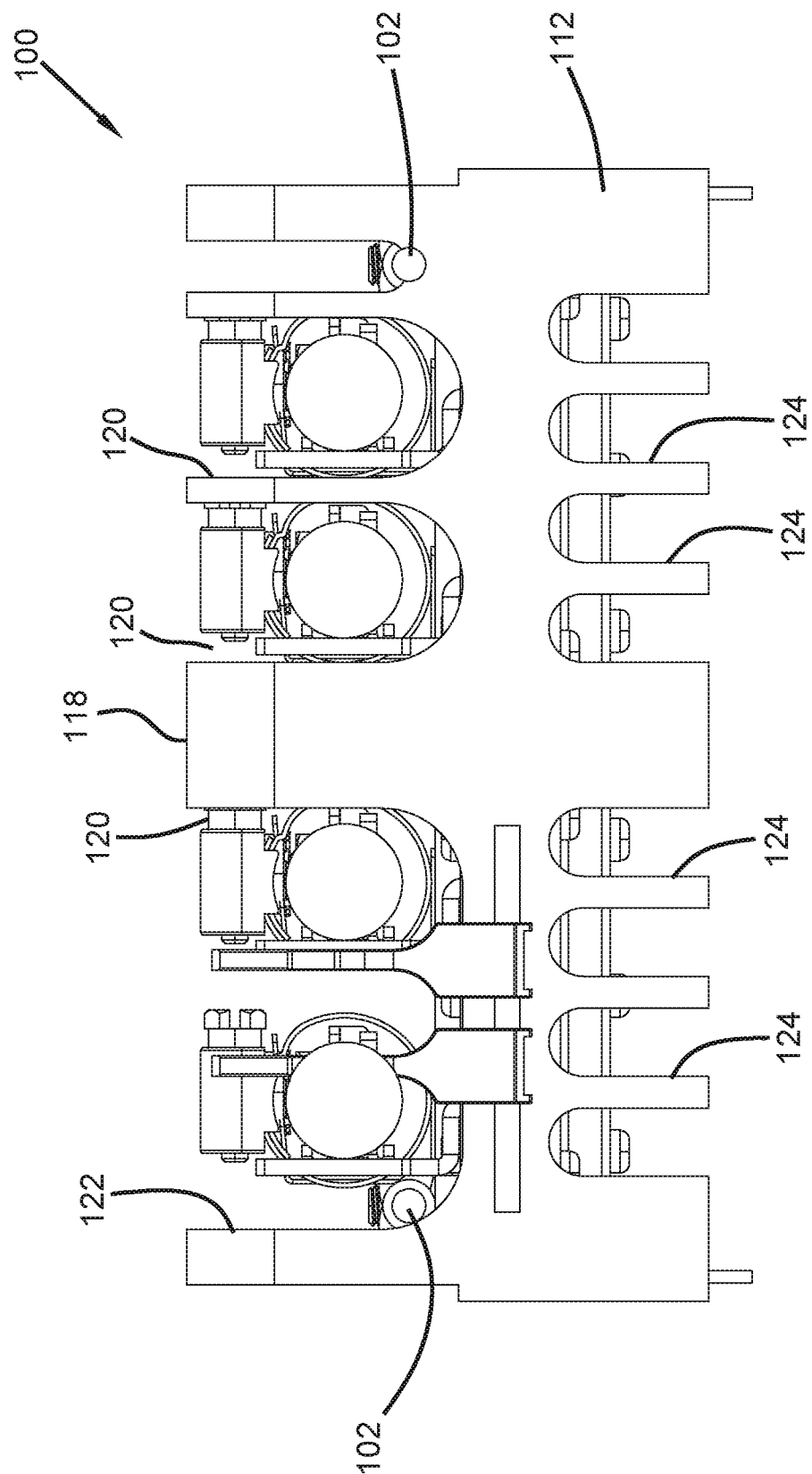
FIG. 5 is a further end view of the cable grounding and fixation assembly of FIG. 1.
Figure 6:
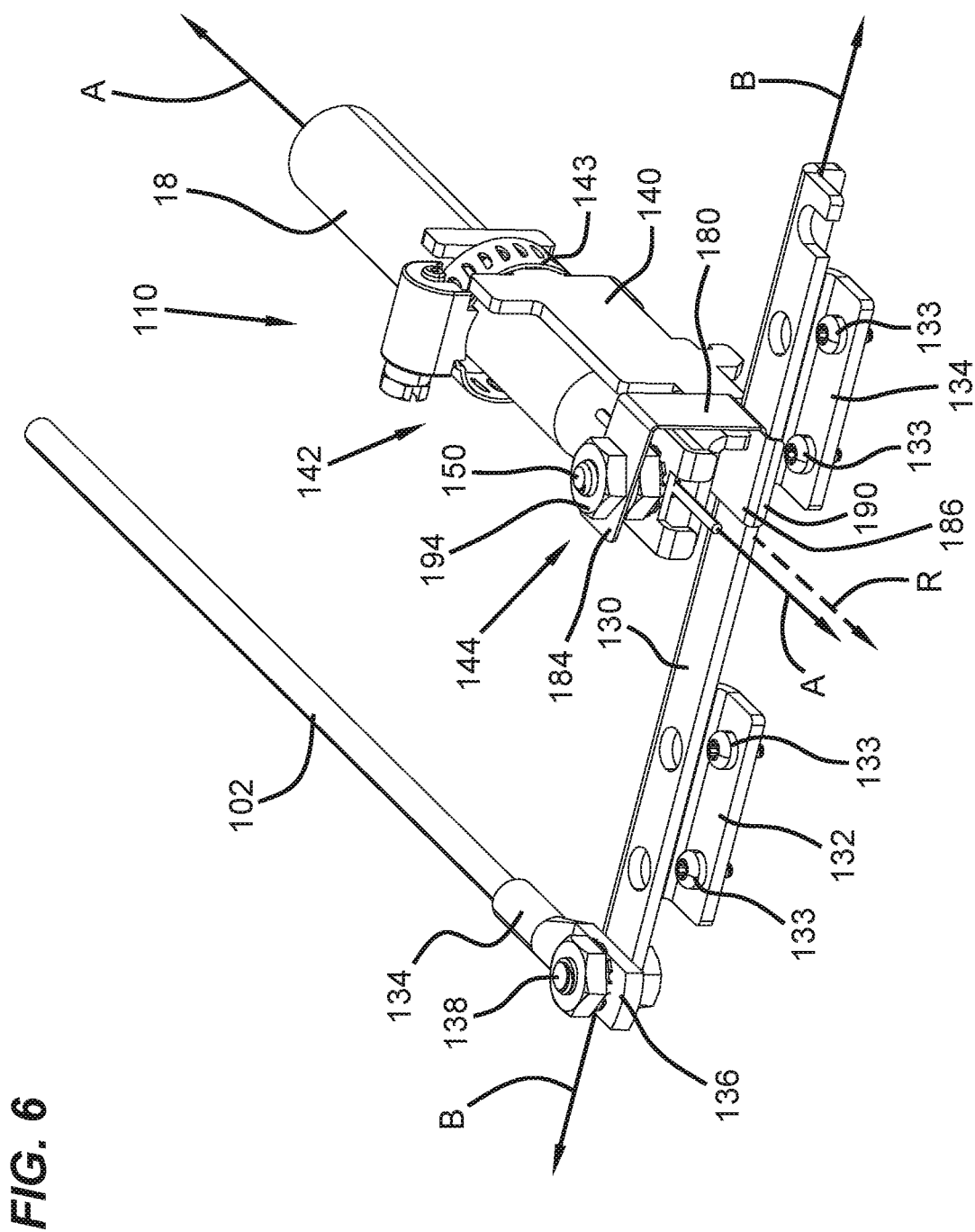
FIG. 6 is a perspective view of a portion of the cable grounding and fixation assembly of FIG. 1.
Figure 7:
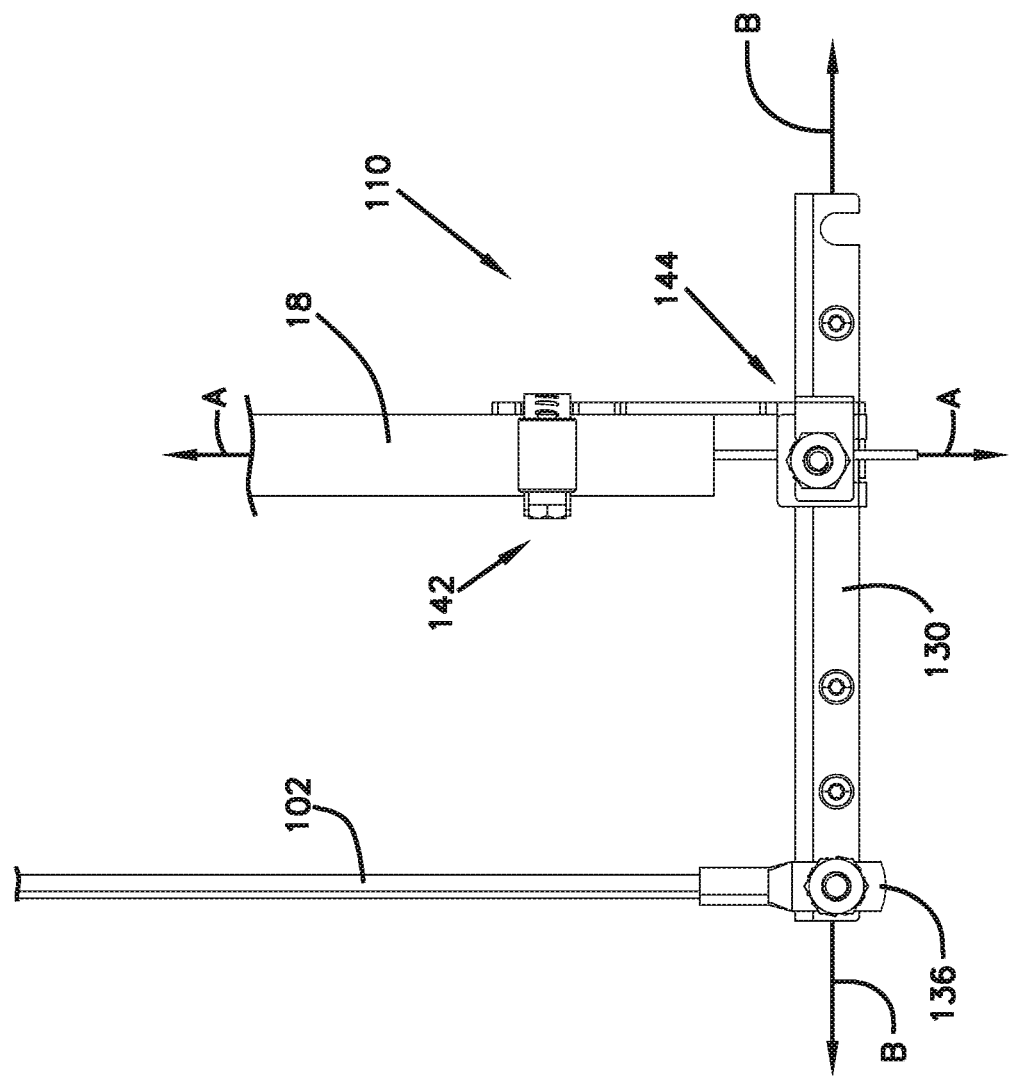
FIG. 7 is a side view of the portion of the cable grounding and fixation assembly of FIG. 6.
Figure 8:
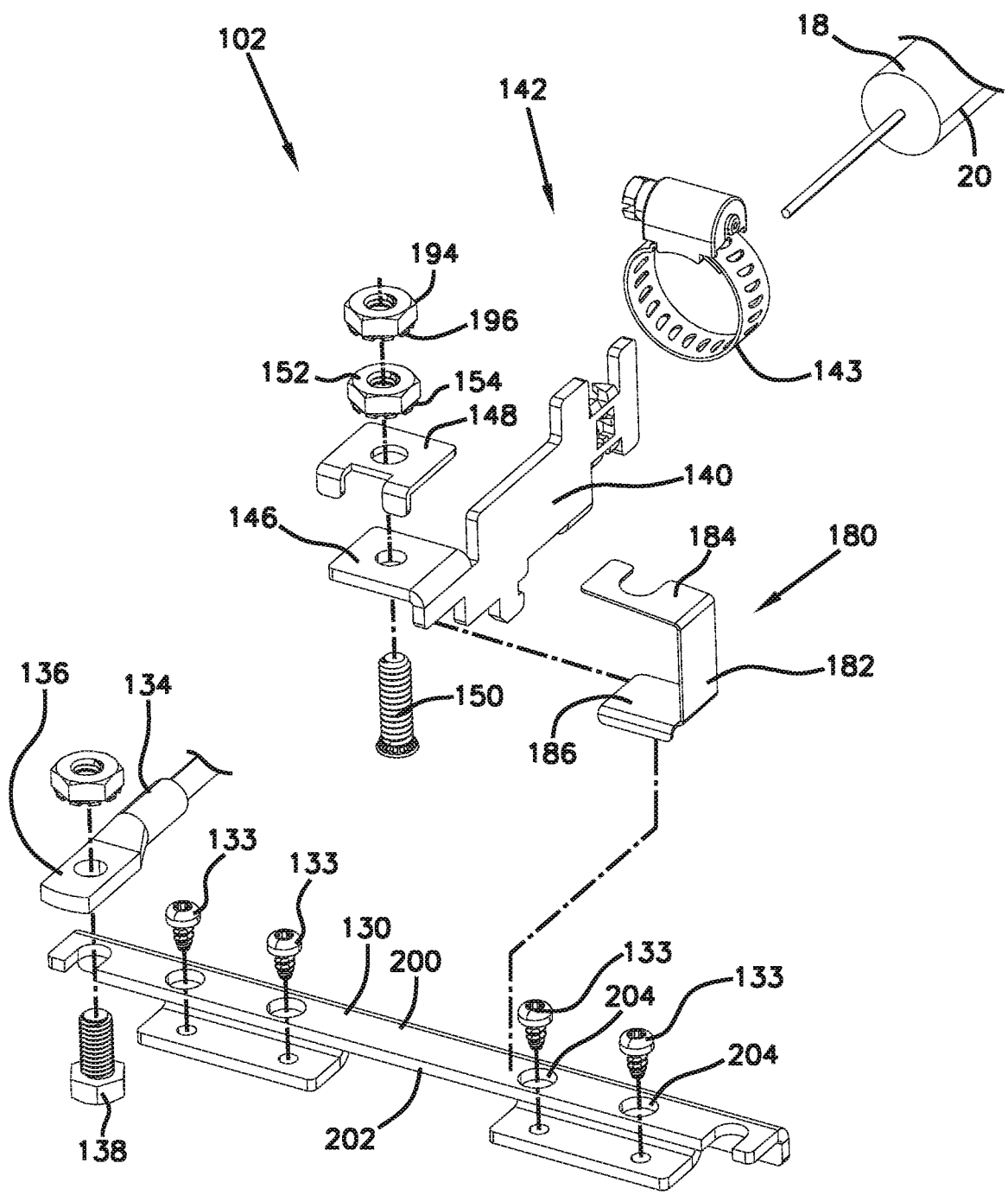
FIG. 8 is a partially exploded view of the portion of the cable grounding and fixation assembly of FIG. 6.
Figure 9:
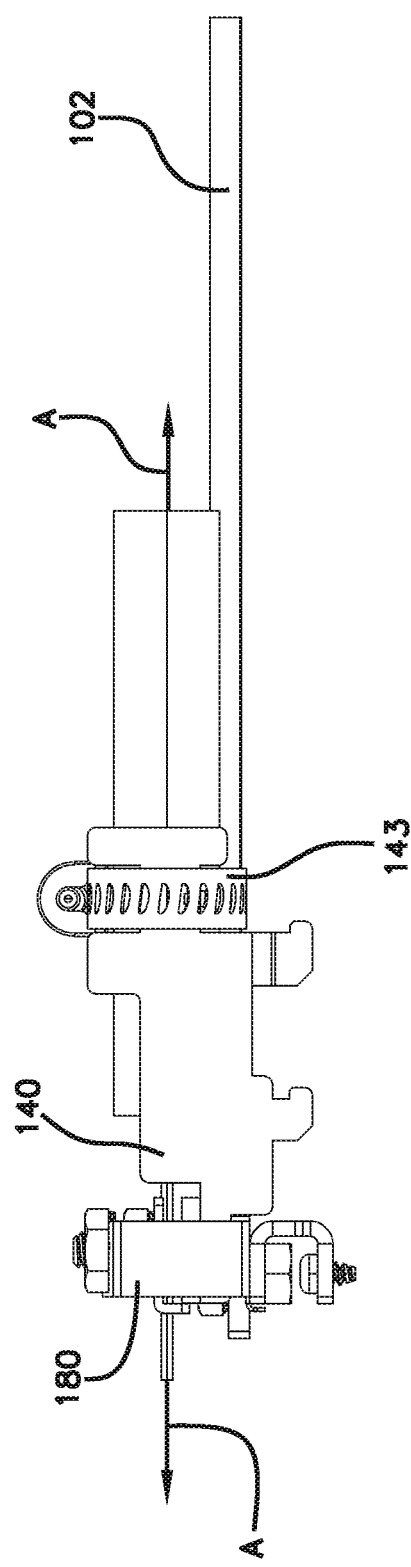
FIG. 9 is a further side view of the portion of the cable grounding and fixation assembly of FIG. 6.
Figure 10:
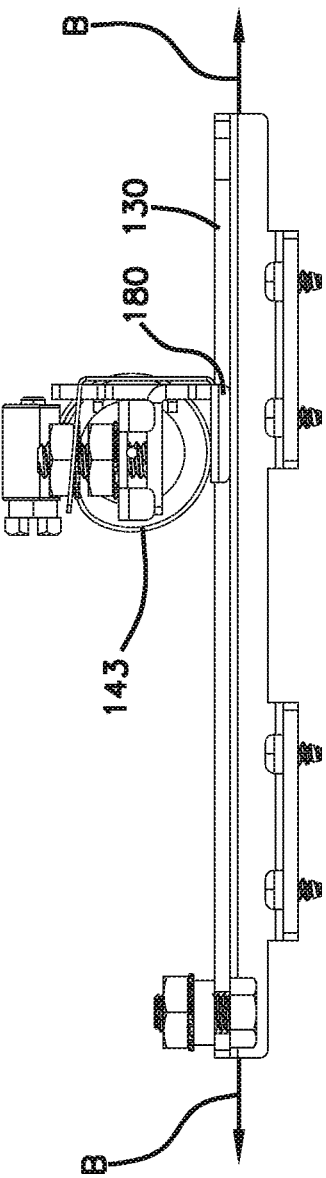
FIG. 10 is an end view of the portion of the cable grounding and fixation assembly of FIG. 6.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIG. 1, components of an example telecommunications closure 10 are depicted. The closure includes a base 12 and a cover 14 that are configured to cooperate to create a sealed and re-enterable closure volume 16 where optical and/or electrical fibers carried into the closure volume by one or more cables can be managed. Portions of example cables 18 are schematically shown. The cables 18 are feeder cables that pass through feeder cable ports defined by the base 12. The cables 18 include outer jackets 20 that are secured to the cable fixing and grounding assembly 100, which is configured to be received within the closure volume 16 when the closure is sealed. The feeder cable ports and other ports (e.g., drop cable ports) are sealable, e.g., with one or more seal blocks 22 adapted to sealingly receive the cables and placed in a seal block holder 24. In some examples, the assembly 100 is secured to the seal block holder 24 or to one or more seal blocks thereof.

The closure 10 can be adapted to provide environmental protection to the contents of the closure volume when the closure is outdoors, below grade, etc.

In certain non-limiting examples, optical fibers 2 from the feeder cables 18 are routed to a fiber organizer 26, which is also configured to be housed within the closure volume 16 of the closure. In some examples, the fiber organizer 26 is secured to the assembly 100. For example, the assembly 100 is secured at a proximal end (closer to the feeder cable ports)

to a seal block and secured at a distal end (farther from the feeder cable ports) to the fiber organizer. The seal block holder 24 and its seal blocks can form an assembly with the base 12, such that the base 12, the assembly 100, and the organizer 26 can be handled as a unit.

An actuator 30 can be used to selectively move the seal blocks between sealing and non-sealing configurations when the base 12 and the cover 14 are mated together. If the closure 10 needs to be re-entered, for example, a technician can rotate the actuator 30 to release the seal, and unlock the latch arms 32 which can be used to latch the base 12 and the cover 14. At this point the base 12, along with the assembly 100 and the organizer 26 can be removed as a unit from/away from the cover 14.

The organizer 26 can include one or more fiber management structures and/or devices, such as guide channels for tubes carrying fibers and/or the fibers themselves, spool structures, retention tabs, signal splitter(s), wave division multiplexers, splice structures, indexing structures, etc. In some examples, the organizer 26 includes or is coupled to one or more trays where splices or other fiber management operations can be performed. In some examples a plurality of the trays can be arranged in a stack within the closure volume 16. In some examples, the trays can be pivotally mounted relative to the organizer 26.

Thus, the closure 10 can serve as a re-enterable and re-workable distribution node of a telecommunications network, e.g., with optical and/or electrical signals being transmitted between a provider side (e.g., via feeder cables 18) and a subscribers side (e.g., via drop cables (not shown)) the feeder cables and the drop cables both entering the same closure 10, with optical fibers passing between the two types of cables.

In order to protect the optical fibers and other sensitive equipment housed within the closure 10, one or more of the cables entering the closure are grounded to minimize damage from an electrical surge (e.g., due to a lightning strike). For example, within the closure, one or more of the cables are conductively coupled to one or more grounding rods or grounding cables 102. The grounding cables 102 form part of the assembly 100. The grounding cables 102 exit the closure 10 through ports of the base 12 and are electrically grounded.

To further protect the optical fibers 2 as they are routed and managed within the closure volume 16, portions of the cables (e.g., the feeder cables 18) are fixed to the interior of the closure housing using the assembly 100.

Fixing of the cables in this way helps transfer lateral or axial loads on the cables to the closure housing or other non-sensitive structure(s) rather than to the optical fibers themselves. For example, a spliced optical fiber is highly sensitive to external force, and a force that causes such fiber to shift can damage the splice, or otherwise decrease the fiber's optical performance, e.g., by decreasing its bend radius.

Referring now to FIGS. 2-5, the cable fixing and grounding assembly 100 will be described in greater detail.

The assembly 100 extends from a proximal end 104 to a distal end 106, with the cables 18 entering the closure in which the assembly 100 is to be positioned in a proximal to distal direction. Each of the cables 18 is defined by a central axis A. At least in localized axial segments where the cables 18 are fixed to the assembly 100, the axes A are parallel or substantially parallel to one another. Each cable includes an outer jacket 20. Radially approaching the center axis A of a cable 18, i.e., in a radially inward direction, the cable 18 can include one or more of: a conductive shield that radially surrounds the axis A, a buffer tube (not shown) that radially surrounds the axis A and is positioned within the conductive shield, one or more optical fibers fixed or loosely positioned within the buffer tube, and one or more strength members. The strength members can be electrically conductive or non-electrically conductive. In some examples, one or more strength members are electrically conductive rods that run along or parallel to the axis A. In other examples the strength members include aramid yarn. In the example cables 18, there is a single electrically conductive (e.g., metallic) rod 40 that runs along or substantially along the axis A.

To fix a cable 18 to the assembly 100, a proximal end portion of the jacket 20 is stripped. If the cable includes a conductive shield and/or a buffer tube, proximal end portions of these components are truncated, as is the strength rod 40. In some examples, such as the one depicted, a distal portion 42 of the strength rod extends beyond a distal end 44 of the stripped jacket 20. Optionally, if the cable 18 includes a conductive shield, a portion of the outer jacket 20 is removed to expose the conductive shield so that the conductive shield can be electrically grounded, e.g., via a cable fixation unit 110.

The example assembly 100 includes four cable fixation units 110. It should be appreciated that the number and size of the cable ports defined by the closure essentially dictate the maximum number and types of cables that can be fixed. In addition, fewer cables than the maximum allowable may be managed at a given closure.

Figure 12:
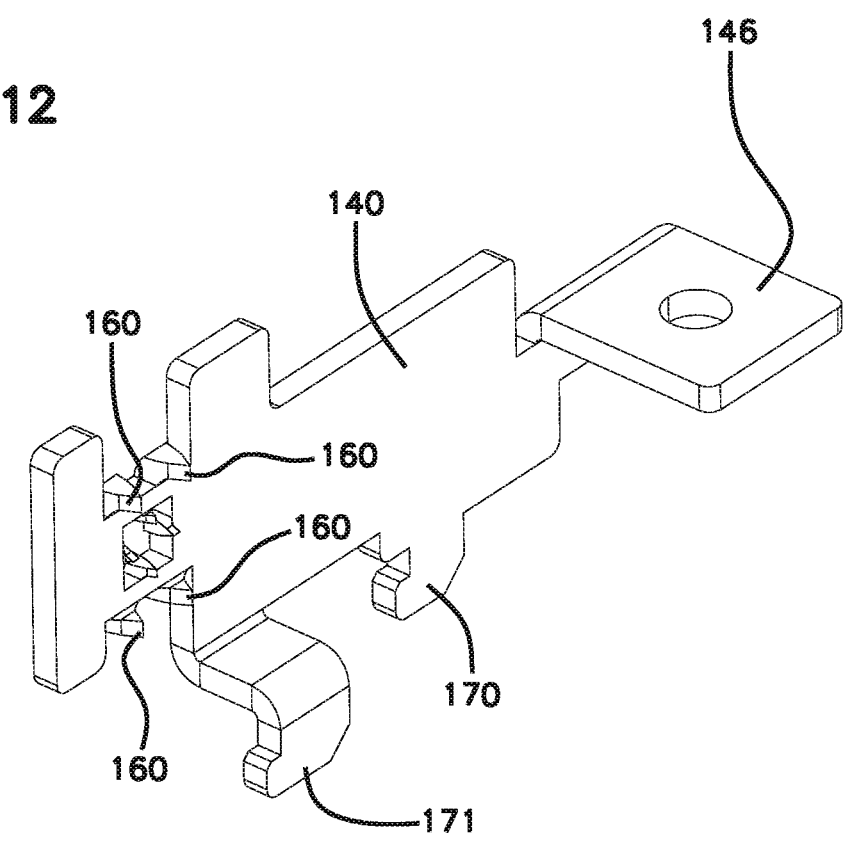
FIG. 12 is a further perspective view of the portion of the cable fixation unit of FIG. 11.
Figure 13:
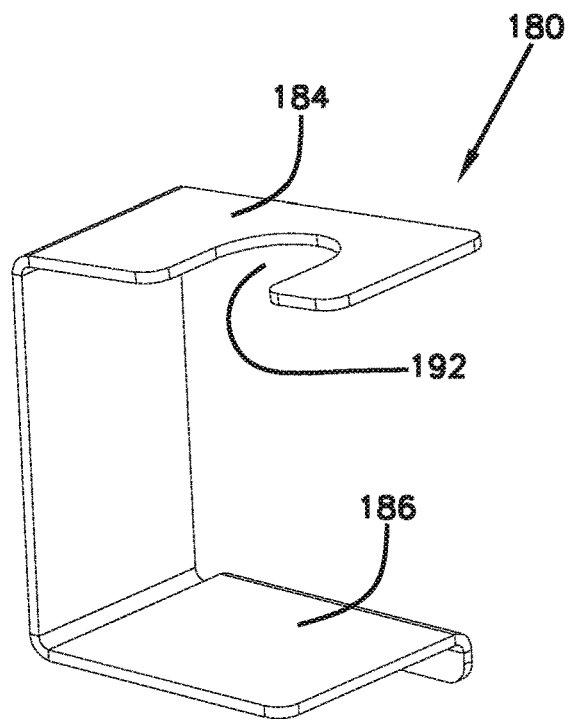
FIG. 13 is a perspective view the grounding coupler of the portion of the cable grounding and fixation unit of FIG. 6.
Figure 14:
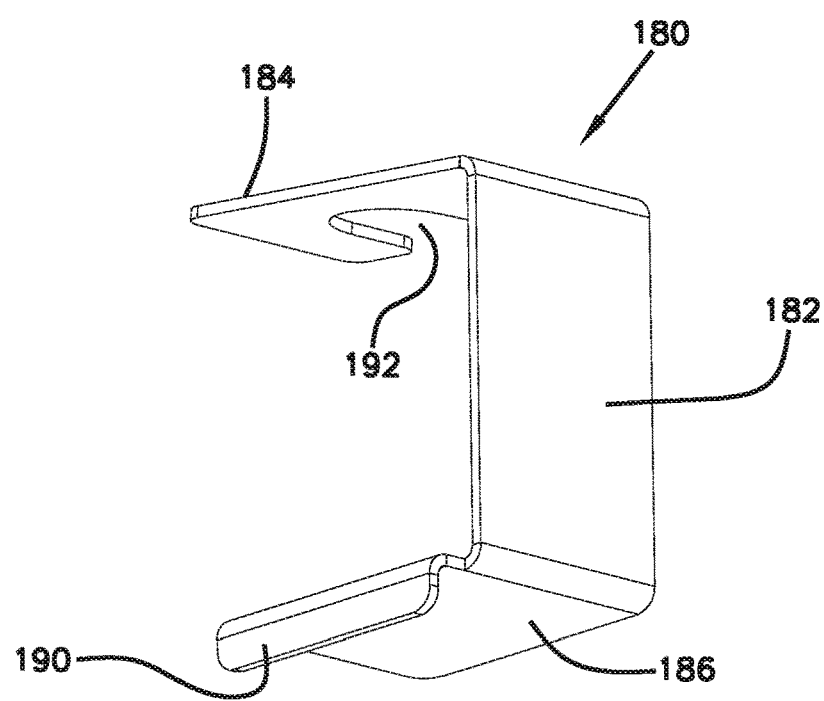
FIG. 14 is a further perspective view of the grounding coupler of FIG. 13.
Figure 15:
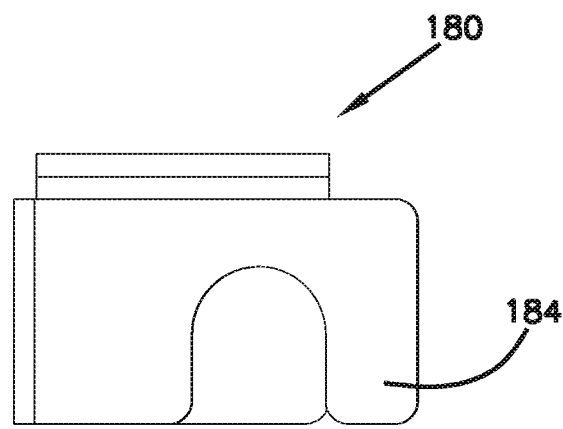
FIG. 15 is a side view of the grounding coupler of FIG. 13.
Figure 16:
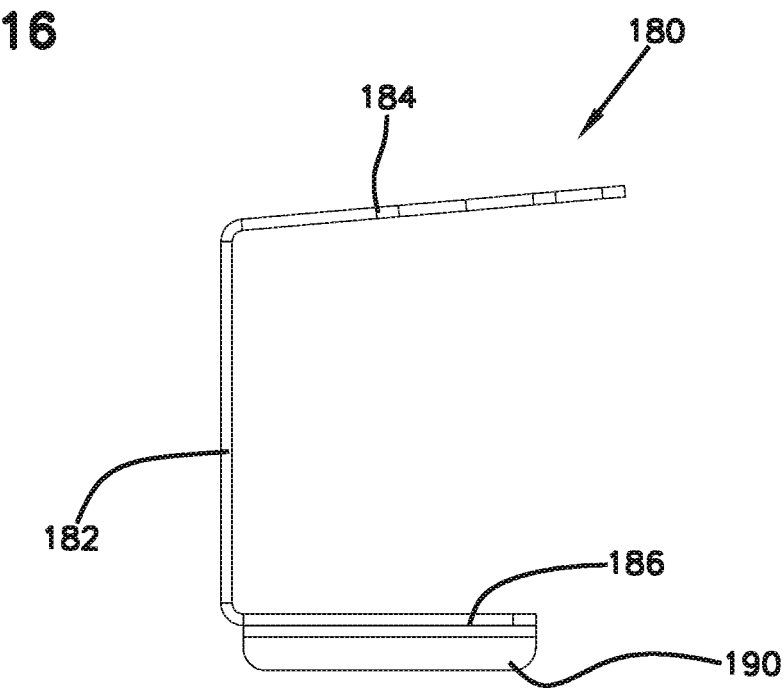
FIG. 16 is a further side view of the grounding coupler of FIG. 13.
Figure 17:
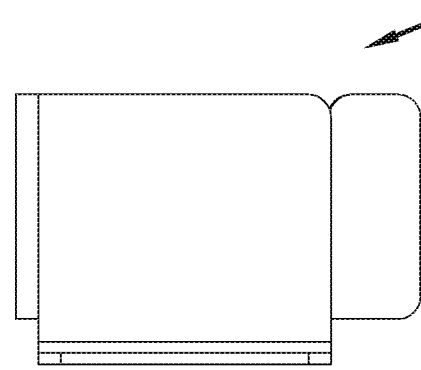
FIG. 17 is a further side view of the grounding coupler of FIG. 13.
Figure 18:
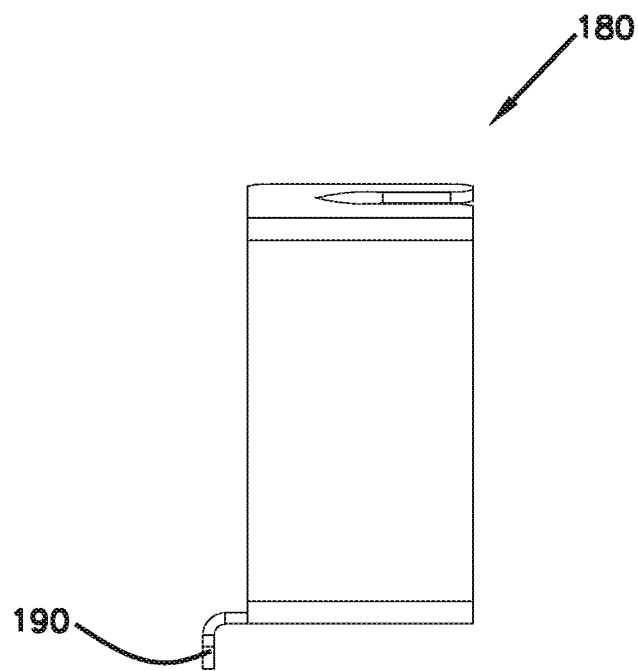
FIG. 18 is a further side view of the grounding coupler of FIG. 13.
Figure 19:
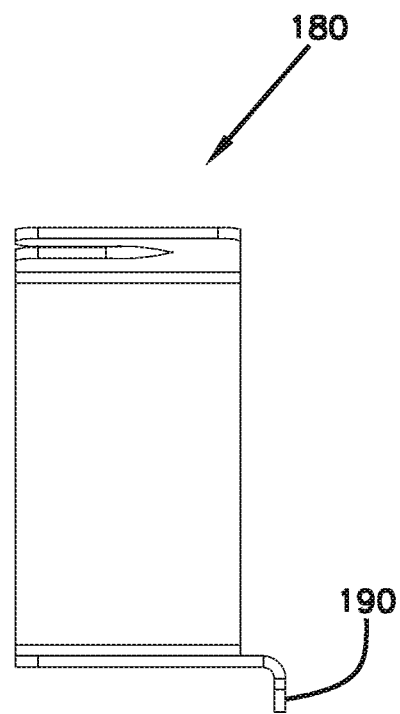
FIG. 19 is a further side view of the grounding coupler of FIG. 13.

The cable fixation units 110 are secured to a support 112. The support 112 includes a divider panel 114 (in some examples, made of a non-electrically conductive material) to which the cable fixation units 110 can be fastened on a first side or surface 116. In some examples, feet 170 (FIG. 12) of the fixation units 110 can be positioned in slots 172 of a slotted base plate 174 that is fastened to the panel 114. One of the feet 171 can engage a locking mechanism such as a flexibly resilient latch arm 176 to provide releasable locking of the fixation unit to the base plate. So that fixation units (and their cables) are not conductively linked to each other via the base plate, in some examples the base plate is made entirely of a non-conductive (e.g., polymeric material). In other examples, such as the one depicted, the base plate 174 includes a plurality of conductive plate members 178, each having slots 172 and each being aligned with a latch arm 176. The plate members 178 are secured to a frame 179. In this example, the frame is made of a non-conductive material and the plate members 178 are made of a conductive material (e.g., a metal), which can provide enhanced strength of the cable's fixation to the closure. In the example shown, each plate member 178 receives just one cable fixation unit. The plate members 178 are each individually fastened to the non-conductive frame 179 and do not touch each other, thereby preserving electrical isolation between cables secured to cable fixation units on different ones of the plate members 178. Further examples of slotted base plates and cable fixation unit coupling and locking thereto are shown and described in U.S. Provisional Patent Application No. 62/795,316 and International PCT Application No. PCT/US2020/014634 filed Jan. 22, 2020, the contents of which applications are incorporated by reference in their entireties.

Additional cable fixation units (e.g., for drop cables entering the closure), can be secured to the opposing surface of the divider panel 114. A proximal end 118 of the support 112 defines a plurality slots or openings 120, 122, 124. The feeder cables 18, as they distally enter the closure, pass through the openings 120. The grounding cables 102, as they distally enter the closure, pass through the openings 122. Drop cables, as they distally enter the closure, pass through the openings 124.

Generally speaking, each cable fixation unit 110 is configured to clamp a portion of a cable jacket and to provide at least a portion of an electrical pathway between one or more electrically conductive parts of the cable it is clamping (e.g., strength rod(s), conductive shield) and a grounding assembly.

Referring now to FIGS. 2-10, a grounding assembly of the assembly 100 includes a grounding bar 130. The grounding bar 130 extends along a longitudinal axis B. When the assembly 100 is assembled, the axis B is perpendicular to the axes A, and reference lines R running parallel to the axes A intersect the axis B, such that the axis B crosses the reference lines R. Each reference line R corresponds to a unique fixation unit 110 and thereby a unique cable attachment location. The grounding bar 130 can be made from a robust electrically conductive material. Mounting flanges 132 extend from the grounding bar 130. The flanges include through holes through which fasteners 133 can pass to fasten the grounding bar 130 to the surface 116 of the divider panel 114. In the assembly 100, the grounding bar 130 is fixed in place relative to the cable fixation units 110.

Electrically conductive sleeves 134 are sleeved around distal end portions of the grounding cables 102. Extending distally from the conductive sleeves are flanges 136 that define through holes through which fasteners 138 can be inserted to electrically couple and secure the grounding cables 102 and the grounding bar 130 to one another.

Figure 11:
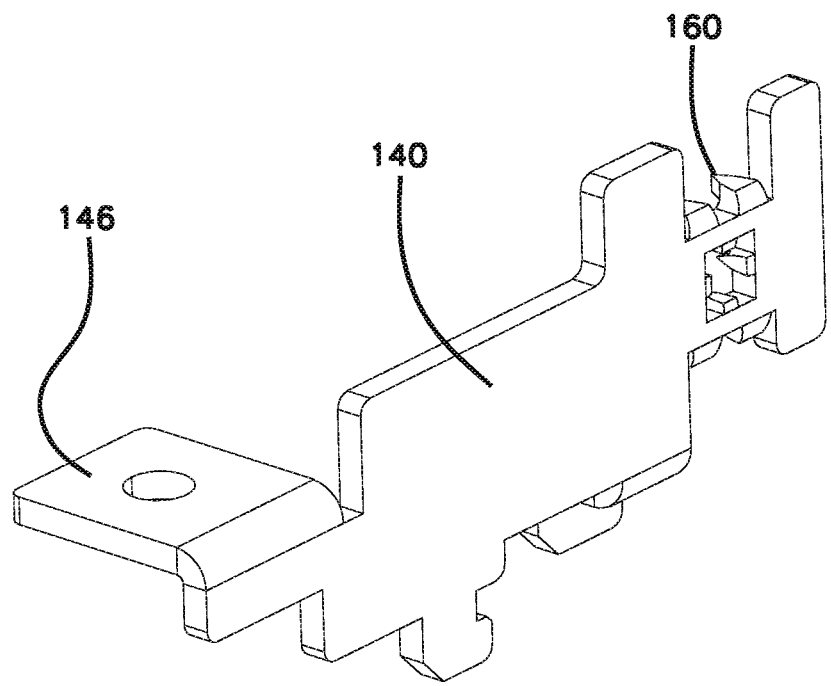
FIG. 11 is perspective view of a portion of the cable fixation unit of the cable grounding and fixation assembly of FIG. 1.

Each cable fixation unit 110 includes a main body 140, a cable fixation portion 142 and a strength member fixation portion 144. In this example, the main body 140 is made of an electrically conductive material. The cable fixation portion includes a cable clamp 143, such as a hose clamp, that is adjustable in circumference to match a given cable size. The cable clamp 143 clamps the cable 18 to the main body 140. In some examples, a conductive shield of the cable 18 makes contact with the main body 140 such that main body 140 and the conductive shield are conductively coupled. For example, the main body 140 can include one or more electrically conductive teeth 160 (FIGS. 11-12) positioned and configured to dig into an exposed portion of the cable's conductive shield and thereby provide conductive coupling between the conductive shield and the main body 140.

The strength member fixation portion 144 includes an electrically conductive platform 146 extending from the main body 140, an electrically conductive pressure plate 148, and a fastening assembly consisting of a bolt or stud 150 and a nut 152 (optionally with a washer or toothed portion 154 to enhance conductive coupling). The strength member 40 is sandwiched between the platform 146 and the pressure plate 148 using the fastening assembly 150, 152 such that the strength member 40 is fixed and, assuming the strength member 40 is electrically conductive, the strength member 40 is thereby conductively coupled to the main body 140.

Referring now to FIGS. 2-19, each cable fixation unit 110 is independently coupled to the grounding bar 130 with its own electrically conductive coupler 180 (e.g., made from one or more metals). In at least some examples, if the coupler 180 is not coupling a fixation unit 110 to the grounding bar 130, then the fixation unit is not conductively coupled to the grounding cables 102. Thus, each cable fixation unit 110 can have a grounded configuration in which the coupler 180 is coupling the fixation unit 110 to the grounding bar 130, and a non-grounded configuration in which the coupler 180 is not coupling the fixation unit 110 to the grounding bar 130. Because each fixation unit 110 has its own associated coupler 180, electrically isolating a first fixation unit 110 (and likewise its corresponding cable) from another fixation unit 110 in an assembly 100 is achievable by removing the coupler 180 associated with one of the first and second fixation units such that that fixation unit is in a non-grounded configuration. Electrically isolating cables 18 from each other by electrically isolating their corresponding fixation units 110 can facilitate cable toning or tracing, as described above. In addition, installing and uninstalling cable fixation units in telecommunications closures is simplified, since each cable fixation unit can be coupled to and decoupled from the closure's grounding assembly components by simply installing or removing a coupler 180.

It should be appreciated that the grounding bar 130 is fixed in position with respect to the support 112 whether the cable fixation units are in grounded or non-grounded configurations. In addition, in assemblies in which the cable fixation units are secured to the support 112 independently of the grounding bar 130, the grounding bar 130 is fixed in position with respect to the cable fixation units, whether the cable fixation units are in grounded or non-grounded configurations.

As mentioned, the conductive coupler 180 selectively conductively couples a cable fixation unit 110 to the grounding bar 130 and thereby selectively conductively couples a cable clamped to the cable fixation unit 110 to the grounding bar 130.

The example electrically conductive coupler 180 is of unitary metallic construction (e.g., machined) and includes a body 182 and first and second spaced apart arms 184, 186 extending from the body 182. The body 182 and first and second arms 184, 186 define a substantially squared C-shaped, or a U-shaped profile. The body 182 and the first and second arms 184, 186 also define an open space 188 between the first and second arms and adjacent the body 182 through which optical fibers 2 extending from the jacketed portion of a cable 18 can extend onto the organizer 26 (FIG. 1). A flange 190 extends from the second arm 186. A portion of the flange 190 extends at a substantially right angle to the second arm 186.

The first arm 184 defines a notch 192. The fastener 150 can be received through the notch 192 and a nut 194 (optionally with a toothed portion 196 to enhance conductive coupling) can be threadably fastened to the fastener 150 such that the first arm 184 is secured between nuts 194 and 152 and thereby conductively coupled through the conductive nut 152 to the conductive pressure plate 148, the platform 146, the main body 140, the strength member 40 and, optionally, the conductive shield of the cable 18. When a fixation unit 110 is in a grounded configuration, the second arm 186 and the flange 190 of the corresponding coupler 180 contact different sides 200, 202 of the grounding bar 130, thereby providing an enhanced conductive path between the cable and the grounding bar 130 via the fixation unit 110 and the coupler 180. In some examples, the coupler 180 is secured with one or more fasteners to the grounding bar 130. For example, a bolt or stud is inserted through the second arm 186 and into a hole 204 in the grounding bar 130 and then secured with a nut. To switch a given cable fixation unit 110 from a grounded to a non-grounded configuration, the nut 194 and the corresponding coupler 180 are removed. In the example shown, the arms of the coupler 180 act as biasing members when the fixation unit is in the grounded configuration, biasing the second arm 186 against the grounding bar 130 with a preload force, the second arm 186 not being fastened to the grounding bar to facilitate its removal and re-placement of the coupling member 180.

From the foregoing detailed description, it will be evident that modifications and variations can be made in the devices of the disclosure without departing from the spirit or scope of the invention.

What is claimed is:

1. A grounding assembly for a fiber optic closure, comprising:
    a plurality of cable fixation units, each cable fixation unit including a main body defining a cable fixation portion;
    a plurality of cable clamps, each cable clamp being configured to clamp a cable to the cable fixation portion of one of the cable fixation units;
    a grounding bar adapted to be electrically grounded via a grounding cable, the grounding bar being in a fixed position relative to a plurality of cable attachment locations, the cable attachment locations being defined by mutually parallel reference lines that are also configured to be parallel to axes of cables when the cables are attached to the cable fixation units positioned at the cable attachment locations, the grounding bar crossing the plurality of reference lines; and
    a plurality of electrically conductive couplers, the couplers being adapted to couple the cable fixation units to the grounding bar by mounting to the cable fixation units and to the grounding bar, the couplers being adapted to selectively conductively couple and selectively electrically isolate telecommunications cables clamped to the plurality of cable fixation units and attached at the cable attachment locations and the grounding bar, the grounding bar being in the fixed position both when the plurality of electrically conductive couplers are conductively coupled to, and electrically isolated from, the grounding bar.

2. The grounding assembly of claim 1, wherein the grounding bar crosses the plurality of reference lines at right angles.

3. The grounding assembly of claim 1, wherein the plurality of electrically conductive couplers are adapted to contact electrically conductive portions of the telecommunications cables.

4. The grounding assembly of claim 1, wherein the plurality of electrically conductive couplers are adapted to contact electrically conductive portions of the cable fixation units mounted at the cable attachment locations, and wherein the electrically conductive portions of the cable fixation units are adapted to contact electrically conductive portions of the telecommunications cables.

5. The grounding assembly of claim 1, wherein the plurality of electrically conductive couplers are selectively placeable in grounding positions and non-grounding positions, wherein in the grounding positions the couplers are configured to establish grounding paths between the telecommunications cables and the grounding bar, and wherein in the non-grounding positions the telecommunications cables are electrically isolated from the grounding bar.

6. The grounding assembly of claim 5, wherein in the non-grounding positions, the telecommunications cables are electrically isolated from one or more other cables that are grounded via the grounding bar.

7. The grounding assembly of claim 1, wherein the grounding bar is electrically connected to a grounding cable configured to extend exteriorly to the fiber optic closure.

8. The grounding assembly of claim 7, wherein the grounding cable connects to the grounding bar at a first location on the grounding bar, and wherein the first location is not between two of the reference lines.

9. The grounding assembly of claim 4, wherein one of the plurality of cable fixation units includes a cable strength member mount for mounting one or more electrically conductive strength members of a corresponding one of the telecommunications cables and a conductive shield engagement component for conductively engaging a conductive shield of the corresponding one of the telecommunications cables, and wherein one of the plurality of electrically conductive couplers is adapted to selectively conductively couple the one or more electrically conductive strength members and the conductive shield to the grounding bar.

10. The grounding assembly of claim 9, wherein the one of the plurality of electrically conductive couplers includes a body and first and second arms extending from the body, the body and first and second arms defining a substantially squared C-shape profile, and wherein when the one of the plurality of electrically conductive couplers is conductively coupled to the grounding bar, the first arm is conductively coupled to the cable strength member mount, and the second arm is conductively coupled to the grounding bar.

11. The grounding assembly of claim 10, wherein a flange extends from the second arm, the flange and the second arm adapted to contact different sides of the grounding bar.

12. The grounding assembly of claim 10, wherein the body of the one of the plurality of electrically conductive couplers contacts the main body of the one of the plurality of cable fixation units when the one of the plurality of electrically conductive couplers is conductively coupled to the grounding bar.

13. The grounding assembly of claim 10, wherein the substantially squared C-shape profile defines an open space through which optical fibers of the corresponding one of the telecommunications cables can extend into an optical fiber management area of the closure.

14. A grounding assembly, comprising:
    a grounding bar;
    a cable fixation unit; and
    an electrically conductive coupler mounted to the grounding bar and to the cable fixation unit, the electrically conductive coupler including a body and first and second spaced apart arms extending from the body, and a flange extending from the second arm, the body and the first and second arms defining a substantially squared C-shape profile, the body and first and second arms defining an open space between the first and second arms and adjacent the body through which optical fibers of a cable clamped to the cable fixation unit can pass, the first of the first and second arms being mounted to the cable fixation unit, and the second of the first and second arms and the flange being mounted to different sides of the grounding bar, the coupler further comprising a notch,
    wherein a fastener extends through the notch and fastens the coupler to a strength member fixation portion of the cable fixation unit.

15. A fiber optic closure for managing optical fibers, comprising:
    a housing defining a closure volume;
    a plurality of cable ports defined by the housing;
    a slotted baseplate;
    a plurality of electrically conductive cable fixation units aligned with the cable ports, each of the plurality of electrically conductive cable fixation units being adapted to be individually removably mounted to the slotted baseplate;

a plurality of telecommunications cables fixed to the cable fixation units; and a grounding assembly for electrically grounding the telecommunications cables, the grounding assembly comprising:

an electrically conductive grounding bar disposed within the interior volume in a fixed position relative to the plurality of cable fixation units and extending perpendicularly to longitudinal axes of the telecommunications cables across all of the telecommunications cables; and an electrically conductive coupler for each of the plurality of cable fixation units, each of the electrically conductive couplers being selectively placeable in a grounding position and a non-grounding position, wherein in the grounding position the electrically conductive coupler is mounted to the grounding bar and to a corresponding one of the cable fixation units such that a corresponding one of the telecommunications cables is conductively coupled to the grounding bar; and wherein in the non-grounding position the corresponding one of the cable fixation units and the corresponding one of the telecommunications cables are electrically isolated from the grounding bar.

16. A fiber optic closure for managing optical fibers, comprising:

a housing defining a closure volume;

a plurality of cable ports defined by the housing;

a plurality of electrically conductive cable fixation units aligned with the cable ports;

a plurality of telecommunications cables fixed to the cable fixation units; and a grounding assembly for electrically grounding the telecommunications cables, the grounding assembly comprising:

an electrically conductive grounding bar disposed within the interior volume in a fixed position relative to the plurality of cable fixation units and extending perpendicularly to longitudinal axes of the telecommunications cables across all of the telecommunications cables; and an electrically conductive coupler for each of the plurality of cable fixation units, each of the electrically conductive couplers being selectively placeable in a grounding position and a non-grounding position, wherein in the grounding position the electrically conductive coupler is mounted to the grounding bar and to a corresponding one of the cable fixation units such that a corresponding one of the telecommunications cables is conductively coupled to the grounding bar;

wherein in the non-grounding position the corresponding one of the cable fixation units and the corresponding one of the telecommunications cables are electrically isolated from the grounding bar; and wherein the cable fixation units include cable strength member mounts for mounting one or more electrically conductive strength members of the telecommunications cables and conductive shield engagement components for conductively engaging conductive shields of the corresponding telecommunications cables, and wherein the electrically conductive couplers are adapted to selectively conductively couple the one or more electrically conductive strength members and the conductive shields to the grounding bar.

17. The closure of claim 16, wherein each of the electrically conductive couplers includes a body and first and second arms extending from the body, the body and first and second arms defining a substantially squared C-shape profile, and wherein when the electrically conductive couplers are conductively coupled to the grounding bar, the first arms are conductively coupled to the cable strength member mounts, and the second arms are conductively coupled to the grounding bar.

18. The closure of claim 17, wherein flanges extend from the second arms, the flanges and the second arms being adapted to contact different sides of the grounding bar.

19. The closure of claim 17, wherein the bodies of the electrically conductive couplers contact main bodies of the cable fixation units when the electrically conductive couplers are conductively coupled to the grounding bar.

20. The closure of claim 17, wherein the C-shape profiles of the electrically conductive couplers define open spaces through which optical fibers of the telecommunications cables extend into an optical fiber management area of the closure.

21. A method of grounding a plurality of cables fixed to a portion of a telecommunications closure at cable fixation units, comprising:

securing electrically conductive couplers to the cable fixation units; and securing each of the electrically conductive couplers directly to a grounding bar that extends across longitudinal axes of all of the plurality of cables, the grounding bar being in a fixed position relative to the cable fixation units and attached to a portion of the telecommunications closure such that the grounding bar is positioned within an interior volume defined by the closure when the closure is in a closed configuration;

electrically isolating a first of the cable fixation units from all of the other cable fixation units only by decoupling the electrically conductive coupler corresponding to the first of the cable fixation units from at least one of the first of the cable fixation units and the grounding bar;

subsequent to the electrically isolating, introducing an electrical toning signal to a first cable fixed to the first of the cable fixation units at a first axial location of the first cable; and subsequent to the introducing the electrical toning signal, recoupling the electrically conductive coupler corresponding to the first of the cable fixation units to the at least one of the first of the cable fixation units and the grounding bar.

22. The method of claim 21, further comprising detecting the toning signal at a second axial location of the first cable, the second axial location being within the interior volume defined by the closure when the closure is in the closed configuration.

* * * * *